May 7, 1946.	B. GROSS ET AL	2,399,797
SPOTWELD HORN AND ELECTRODE ASSEMBLY
Filed Sept. 2, 1944	2 Sheets-Sheet 1
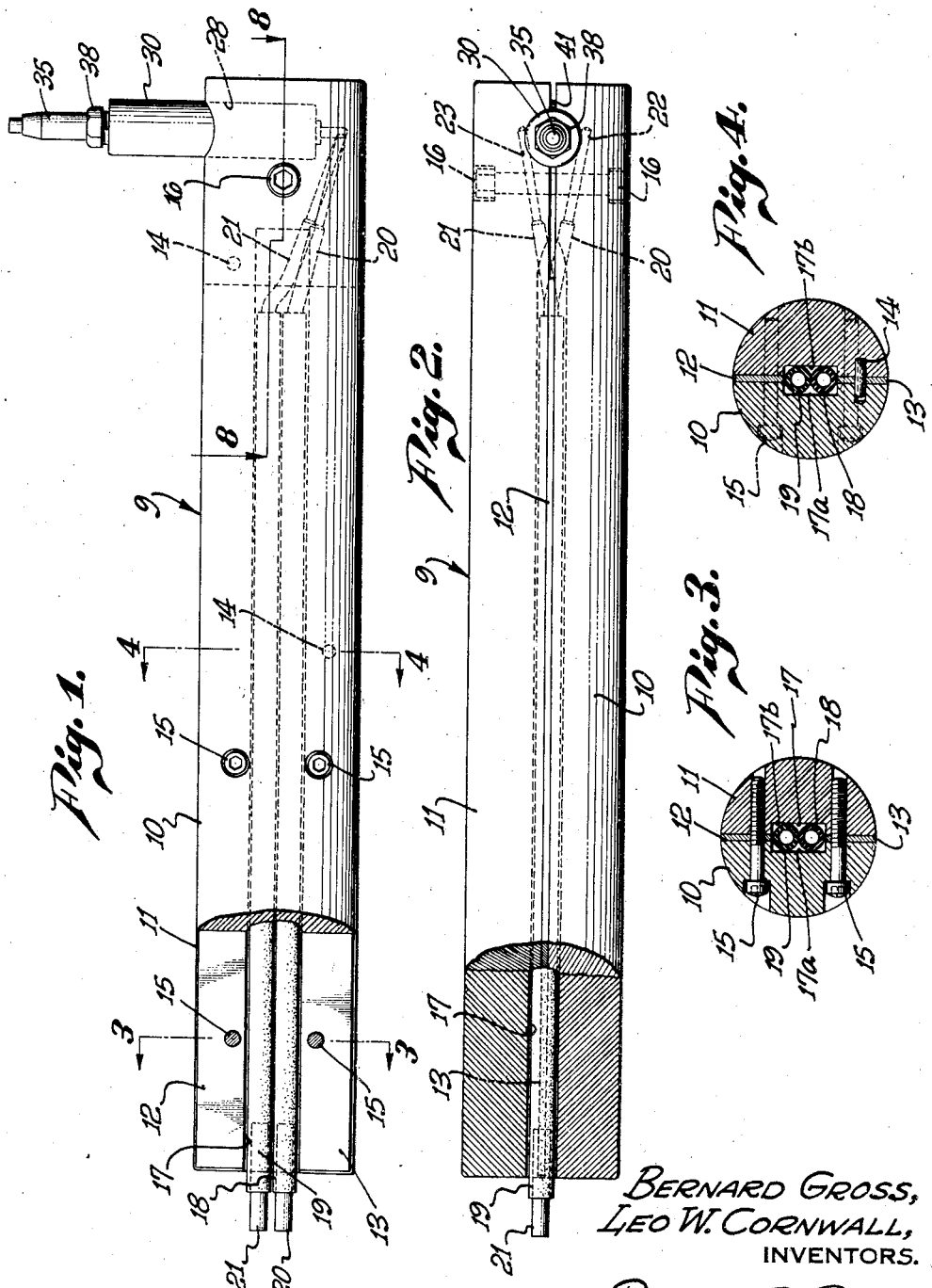
BERNARD GROSS,
LEO W. CORNWALL,
INVENTORS.
ATTORNEY.

May 7, 1946.  B. GROSS ET AL  2,399,797
SPOTWELD HORN AND ELECTRODE ASSEMBLY
Filed Sept. 2, 1944  2 Sheets-Sheet 2
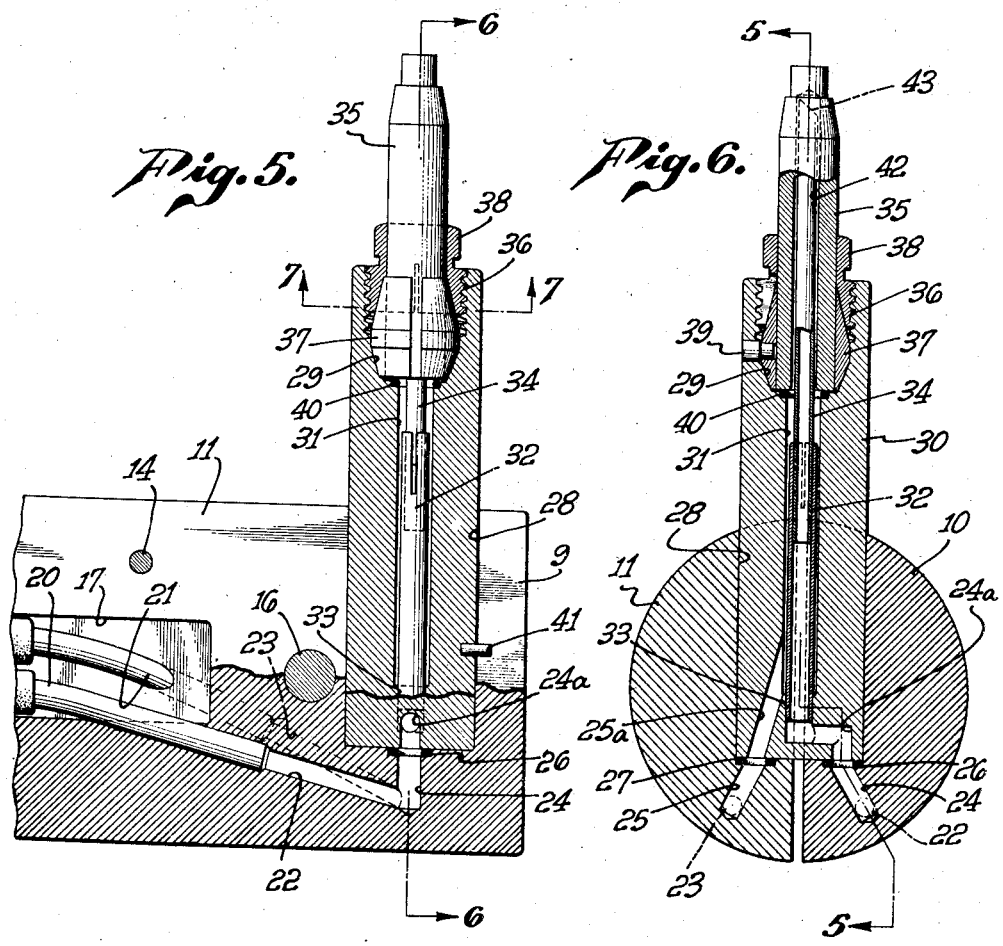
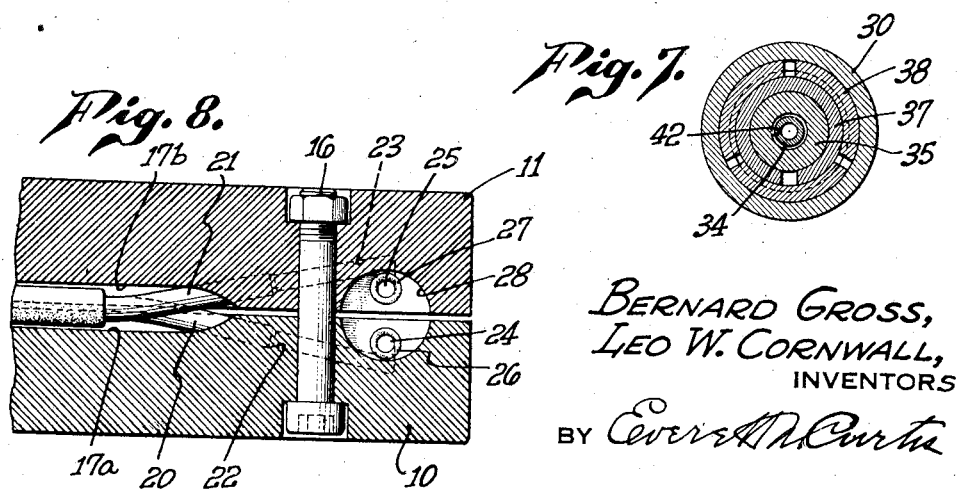
BERNARD GROSS,
LEO W. CORNWALL,
INVENTORS.
BY Everett M. Curtis
ATTORNEY.

Patented May 7, 1946

2,399,797

UNITED STATES PATENT OFFICE 2,399,797

SPOTWELD HORN AND ELECTRODE ASSEMBLY

Bernard Gross and Leo W. Cornwall, San Diego, Calif., assignors to Rohr Aircraft Corporation, Chula Vista, Calif., a corporation of California Application September 2, 1944, Serial No. 552,490

6 Claims. (Cl. 219—4)

Our invention relates to spotweld horns and electrode assemblies and its objects are to effect a re-arrangement of parts whereby the electrode cooling tubes may be located out of the way inside instead of obstructively outside the spotweld horn; to provide a spotweld horn which is stronger at its electrode end than in any of the types now in common use, so as to secure a consequent minimum of deflection when the horn is placed under electrode pressure; to afford a means of bottoming the electrode holder so that it will remain rigid in position without depending upon the friction of the holder against the horn to secure it in place; to bring about a better sealing of the several parts so as to guard against water leaks; and to permit the ready assembly and replacement of parts and render the same more accessible for repair. These and other objects will appear from the drawings and as hereinafter more particularly set forth and described.

At the present time the conventional construction for spotweld horn and electrode assembly has included the use of a solid bar known as the "horn," which is held in a casting known as the "arm." At the outer end of the horn, there is usually employed one of two methods for securing thereto in upright position the electrode holder. One of these methods involves the use of a plate having a half round recess in one side thereof shaped to engage with the shank of the holder, which plate is fastened to the end of the horn by bolts tightened in horizontal position. The other method involves the use of a section of the horn that is cut away to make a jaw which is bolted back again upon the horn, the electrode holder being gripped and held in half round registering recesses formed between these parts. In each of these cases, friction is relied upon entirely to hold and maintain the electrode holder upright in operative position. For securing the electrodes in the electrode holders, it has been the practice either to shape the lower end of the electrode to fit a tapered recess in the holder or to employ a straight shank electrode which may be secured in an opening in the holder by tightening the walls of the holder adjacent to said opening by means of a nut. Also the conventional methods of cooling the electrodes by the circuitous passage of water thereto through the electrode holder have included the use of two externally disposed pieces of hose which are attached to said holder near one end thereof, one of which pieces serves as an inlet tube for the water and the other for an outlet.

Some of the disadvantages of these conventional horn and electrode assemblies are:

(1) In the case of the lower horn, the bottom end of the electrode holder extends through and below the outer end of the horn, and together with the pieces of water hose leading to and out of such holder tends to prevent the positioning close to the horn of the parts to be welded.

(2) It is difficult to obtain secure attachment of the electrode holder to the horn because of the fact that the securing bolts must be tightened sufficiently to bring about the necessary frictional contact to prevent displacement; and even when such attachment is accomplished the holder is often caused to be out of line.

(3) The horns do not have the full strength of the horn diameter because they have been sectioned in such a manner that only a part of the full diameter strength is obtained.

(4) Where the tapered electrode is used, it has been found difficult properly to machine the same, and also, after it has been installed, to detach it from the holder. And where the straight shank electrode is used, it has been found to be unsatisfactory because of the impossibility at all times of effectively sealing the same; the rubber seals usually placed in a groove inside of the holder for this purpose being difficult to install, maintain and replace.

These disadvantages have been overcome in our improved horn and assembly. Primarily our invention consists in constructing a spotweld horn which has been longitudinally split so as to form two substantially equal halves, the central portion of which halves has been machined so that the inlet and outlet cooling tubes, together with their insulations, may be installed inside of the horn while the two halves are being assembled and connected. Preferably shims may be inserted between the major portion of the halves to separate and hold the same in proper relation through the use of dowels adequately disposed, leaving the small outer end portion of the divided horn free from said shims, within which portion an upright socket is formed for the seating of and securing the lower end of the electrode holder against a rubber bottom or rubber like seal. A straight shank electrode is secured in the electrode holder by means of a specially designed collet and bottom ring seal; the said collet serving to bring about sealing of the contacting parts against water leaks.

Attention is hereby directed to the accompanying drawing illustrating a preferred form of our invention in which similar numerals of designation refer to similar parts throughout the several views, and in which—

Figure 1 is a side elevation, partly in section, of our improved spotweld horn and electrode assembly;

Fig. 2 is a plan view, partly in section, of the horn and assembly shown in Fig. 1;

Fig. 3 is a transverse section on line 3—3 of Fig. 1, looking in the direction of the arrows;

Fig. 4 is a transverse section on line 4—4 of Fig. 1, looking in the direction of the arrows;

Fig. 5 is an enlarged longitudinal section of the outer end of the spotweld horn, showing the construction of electrode socket, electrode, inlet and outlet tubes and connecting passageways, and adjacent parts;

Fig. 6 is a transverse section of the end of the spotweld horn and connections shown in Fig. 5, looking in the direction of the arrows;

Fig. 7 is an enlarged transverse section on line 7—7 of Fig. 5, looking in the direction of the arrows; and Fig. 8 is an enlarged longitudinal section on line 8—8 of Fig. 1, looking in the direction of the arrows.

Referring to the drawings—the spotweld horn 9, of any suitable electric conducting metal, but preferably of hard drawn electrolytic copper, is made in two halves or parts 10 and 11, which are preferably separated by shims 12 and 13, respectively, lying on each side of the closed passageway or trough 17 which is formed through the registration of longitudinally extending channels 17a and 17b in adjacent portions of the walls of said halves. Dowels 14, driven into the inner walls of the halves 10 and 11, and engaging with openings in said shims, serve to hold and maintain the same in required position. As shown in the drawings, the shims 12 and 13 while extending longitudinally through the most of the space between said halves, stop a substantial distance short of the outer end of the horn 9 in order to provide for the reception of the electrode holder 30 and for passageways leading to and from the same. For securing together the halves 10 and 11, we employ set screws 15 and bolts 16, or similar detachable means well known in the art. Within said passageway 17, are normally installed the heat insulated inlet and outlet cooling tubes 20 and 21, their inner ends connecting in the usual way with a pump and water tank or similar water supply equipment, and their outer ends extending beyond the outer end of the passageway 17 into or making connection with inlet and outlet passages 22 and 23 communicating with inlet and outlet portals 24 and 25, formed in the body of the horn 9.

Within the outer end portion of the horn 9 is the vertically disposed socket 28 made by the registration of half round recesses formed between the halves 10 and 11 and shaped to receive the base of the electrode holder 30; the adjacent portions of said horn being provided with channels 24a and 25a registering with inlet and outlet portals 24 and 25 of said holder base, and sealing rings 26 and 27 being fitted in place about the openings so connected to render watertight the line of juncture thereof, and resiliently to bottom the said electrode holder. A line-up pin 41, engaging with an opening in the wall of the electrode holder 30 and bridging the space between the halves 10 and 11, serves to position the said holder in said socket 28 in required relation to the horn 9 and the passages therethrough. Communicating with the upper ends of the channels 24a and 24b is the central chamber 31 of the holder 30, the lower part of which chamber is constricted to form a pocket 33, in the top of which is hermetically press fitted the lower end of the metallic sleeve 32; the upper end of said sleeve 32 telescoping with the nozzle 34. As will be observed from Figs. 5 and 6, the arrangement of these tubes 32 and 34 outside of pocket 33, is such that ample space and clearance is provided between the walls thereof and the wall of the chamber 31; also that while the upper end of channel 24a communicates solely with the interior passage of said sleeve 32, the upper end of the channel 25a communicates solely with the space between the wall of chamber 31 and the wall of sleeve 32.

At the top of the electrode holder 30 and communicating with the chamber 31 is formed the socket 29, within which is seated the split collet 37 whose interior opening is shaped to embrace and hold in operative position the shank of electrode 35; the upper part 36 of said socket 29 being threaded to receive the threaded shank of the collet nut 38 the hollow of which is shaped to engage with the upper surface of the taper of the collet 37. Upon tightening the nut 38, the taper of the collet is firmly gripped, and its wall compressed in the well known way upon the body of the electrode, thereby securing a complete seal against water leakage. Preferably to hold the said collet against turning or displacement after being installed I employ the pin 39, engaging with an opening in the wall of the socket 29, and an opening in the wall of the collet registering therewith. In order that the electrode 35 and the collet 37 may be securely bottomed in the electrode holder 30, I shape the bottom of the socket 29 so that the base of the said electrode and its collet will be seated and bear directly against the main body of said holder, except as separated therefrom by the seal ring 40. Within the electrode 35 is formed the passageway 42 extending nearly to the tip thereof and communicating and registering with the chamber 31; and extending upwardly through said passageway 42 but stopping short of the end thereof is the upper portion of the nozzle 34 terminating in the mouth 43. Between the wall of said passageway 42 and the wall of the nozzle 34 is left a peripheral space for ample clearance and flowage of water, which space communicates with the similar peripheral space formed below in the chamber 31.

In the circulation of water through this horn and assembly, the cool water, pumped in from a storage tank or coming from a water system in the manner well known in the art, enters the inlet tbe 20 and flows therethrough to the inlet passage 22, thence to the inlet portal 24, through channel 24a, and upwardly through the passageways of sleeve 32 and nozzle 34 to emerge therethrough into the end of passageway 42 in the electrode 35, adjacent to the tip thereof. Continuing its course, the water passes downwardly through the spaces within the walls of the passageway 42 and chamber 31 and outside the walls of the nozzle 34 and the sleeve 32, and entering the channel 25a, flows outwardly through outlet portal 25, outlet passage 23, and is discharged through outlet tube 21 back to the tank or is otherwise disposed of. During such circulation, the passage of water causes the electrode, electrode holder, horn and adjacent parts to be cooled or greatly reduced in temperature; and for such purpose the flow of the water may be regulated as circumstances may require in the manner well known in the art.

Among other advantages of this form of construction are the provision of a split arm which permits the electrode cooling tubes to be located inside of the horn; the employment of a split horn which is stronger at the electrode end than any of the former types with a consequent minimum of deflection when placed under electrode pressure; the provision of means of bottoming the electrode holder so that it will remain rigid without depending entirely on the friction of the holder against the horn to secure it in the horn; the creation of a new type of electric holder having a specially designed collet and bottom seal to hold a straight shank electrode, thereby effectively sealing the electrode, preventing water leaks, and making possible the easy replacement of ring seals; and the designing of a cooling system which makes possible the connection of cooling tubes running longitudinally through the interior of the horn to and through the electrode holder, including the use of a seal or seals at the junction where the bottom end of the electric holder comes in contact with the bottom of the horn.

Our invention may be embodied in other forms or carried out in other ways without departing from the spirit or essential characteristics thereof. The present embodiment of our invention as hereinbefore set forth is therefore to be considered as in all respects as illustrative and not restrictive, the scope of our invention being indicated by the appended claims, and all changes which come within the meaning and range of equivalency of the claims are intended to be embraced therein.

What we claim and desire to secure by Letters Patent is:

1. In a spotweld horn and electrode assembly, the combination of a longitudinally split spotweld horn, an electrode and electrode holder therefor, means associated with the end of said horn for bottoming said electrode holder therein and maintaining the same in upright position, the outer end of said horn and the electrode holder having connected passages therein for the circulation of water to and from the body of said electrode, and removable inlet and outlet water tubes housed within said horn and connected with said passages and forming therewith a circulatory system for cooling said electrode.

2. In a spotweld horn and electrode assembly, the combination of a spotweld horn composed of two connected longitudinally divided halves, an electrode and electrode holder therefor, said horn having an upright socket in the outer end thereof shaped to bottom and hold said electrode holder rigidly in upright position, the outer end of said horn and the holder having connected passages therein for the circulation of water to and from said electrode for cooling the same when said holder is located in said socket, and removable inlet and outlet water tubes housed within said horn and connecting with said passages and forming therewith a circulatory system for cooling said electrode.

3. In a spotweld horn and electrode assembly, the combination of a spotweld horn longitudinally divided to form two substantially equal halves, an electrode and electrode holder therefor, said horn having near one end thereof a socket formed between said halves for receiving, bottoming and holding said holder firmly in upright position, and quick detachable means for separably connecting said halves, the outer ends of said halves and the holder having connected passages therein for the circulation of water to and from said electrode when said holder is located in said socket, and removable inlet and outlet water tubes housed within said horn and connecting with said passages and forming therewith a circulatory system for cooling said electrode.

4. In a spotweld horn and electrode assembly, the combination of a spotweld horn longitudinally divided into two separable parts, shims interposed between said parts and secured thereto, an electrode and electrode holder therefor, said horn having an upright socket to bottom said holder and hold the same rigidly in operable position, the outer end of said horn and holder therefor having passages therein for the circulation of water to and from said electrode when said holder is located in said socket, and removable heat insulated inlet and outlet water pipes housed within said horn and connecting with said passages and forming therewith a circulatory system for cooling said electrode.

5. In a spotweld horn and electrode assembly, the combination of a spotweld horn longitudinally divided to form two substantially equal halves, an electrode and holder therefor, said horn having formed between said halves a central passageway extending nearly its entire length and an upright socket located in one end thereof beyond said passageway, within which socket said electrode holder is bottomed and held firmly in upright position, removable inlet and outlet water tubes located and housed in said passageway and connected with other passages in said horn leading to said electrode and forming a circulatory system for cooling said electrode, and means for securing together and detaching the said substantially equal halves.

6. In a spotweld horn and electrode assembly, the combination of a spotweld horn longitudinally divided to form two substantially equal halves, an electrode holder therefor, an upright socket located at one end of said horn and formed by registering openings in the adjacent walls of said halves, within which socket said holder is bottomed and firmly held in upright position, said holder having a well depressed in the top thereof, a hollow electrode and collet means for wedging the shank of said electrode within the walls of said well, removable inlet and outlet water tubes housed within said horn and connected with passages leading to and from the hollow of said electrode and comprising a circulatory system for cooling the same, and means for detachably connecting the said substantially equal halves.

BERNARD GROSS.
LEO W. CORNWALL.